July 9, 1963

H. SERNETZ 3,097,022

ELASTICALLY MOUNTED ANTIFRICTION BEARING STRUCTURES

Filed Jan. 12, 1961

INVENTOR
HEINZ SERNETZ
BY

ATTORNEYS.

United States Patent Office 3,097,022
Patented July 9, 1963

3,097,022
ELASTICALLY MOUNTED ANTIFRICTION
BEARING STRUCTURES
Heinz Sernetz, Alte Poststrasse 98, Graz-
Eggenberg, Austria
Filed Jan. 12, 1961, Ser. No. 82,200
Claims priority, application Austria Jan. 14, 1960
2 Claims. (Cl. 308—20)

This invention relates to bearings and aims to provide an elastically mounted antifriction bearing structure for a tubular roller.

The tubular rollers with which my invention may be most advantageously employed are primarily those that are used as support rollers for roller conveyors, conveyor bands, roller trains and like conveying means. The support rollers used in such equipment are comparatively long, the diameter of such a roller being but a fraction of its length. Such a support roller is customarily made from a piece of commercial tubing cut to suitable length and provided with a bearing at each of its ends.

The most desirable bearings for support rollers such as are referred to above are of the antifriction type, e.g., ball bearings. However, considerable difficulty has been encountered in connecting antifriction bearings with support rollers. Such bearings are very delicate machine parts which require precision tooled support elements. A little jamming or misalignment of the bearing ring with respect to the rotating part or the bearing support, or an eccentric load on the bearing, may cause serious difficulties and may even lead to an early failure of the bearing. Furthermore, the load that can be applied to an antifriction bearing is severely limited as overloading will cause such bearings to become overheated and the life of the bearing is reduced thereby.

One expedient that has been resorted to in the past for connecting antifriction bearings with their support rollers has consisted in welding to each end of the support roller a plate having an axial projection extending outwardly therefrom. The pair of extensions provide a rotary axle which is journaled in the bearings. Such a construction is expensive because of the welding operations involved and also because each of the axial extensions requires centered turning. Furthermore, the bearings are located in a relatively unprotected position.

Antifriction bearings have also been connected with tubular support rollers through a "press fit." This has involved machining the inner surface of each end of the tube forming the support roller so that its inner diameter is such that an antifriction bearing can be forced into each end of the tube where it is held by frictional contact between the outer bearing race and the inner wall of the tube. While bearings which are used within a tube in this manner are in a protected location, installation is difficult and the direct metal-to-metal contact between the bearing structure and the support roller renders the bearings particularly susceptible to the influence of impact forces to which such bearings are particularly sensitive. Attempts have been made to alleviate this condition by wedging a rubber part between the outer bearing race and the inner wall of the support roller, but the benefits resulting therefrom have not been sufficient to justify the cost involved.

Another expedient that has been resorted to for mounting bearings within a tubular support roller has consisted in placing a rubber ring in the conveyor roller and a pair of bushings has been placed in contact with the outer bearing race so that they are wedged between the outer bearing race and the rubber ring to clamp that ring between the bushings and the inner wall of the support roller. However, as these bushings immediately contact the outer bearing race and support it, they constitute a more or less rigid bearing therefor. Hence, the rubber ring which is clamped between those bushings and the inner circumference of the support roller is only effective as a damper. It does not provide an improved transverse distribution of existing forces which alone could result in any notable improvement in the distribution of forces.

I have discovered that it is possible to overcome the foregoing disadvantages in past mountings for the antifriction bearing of support rollers by connecting the antifriction bearings to their associated support roller in an elastic but positive manner through an inexpensive mounting that permits ready assembly and disassembly of the antifriction bearings and support roller.

In the practice of my invention, an antifriction bearing structure is elastically mounted within a tubular roller by placing an elastic collar between the outer race of the bearing and the inner wall of the roller. Compression washers are placed on opposite sides of the elastic collar and axial tie rods are provided that are adapted to draw those washers towards each other and deform the collar so that it expands radially and presses against the outer bearing race and the inner wall of the collar.

It is a particular feature of my invention that, not only is the elastic collar in direct contact with the outer race of the antifriction bearing, but it also exerts an inwardly directed radial pressure on that race; and the tie rods that I employ in the practice of my invention make it possible to cause that elastic collar to exert a substantial pressure on the outer bearing race. When the outer bearing race is under strong radial pressure from an elastic pressure body such at the collar that I use in the practice of my invention, the outer bearing race may be deformed to a slightly oval shape under the influence of load on the bearing, which is applied perpendicular to the bearing axis, and which is constantly changing direction in relation to the bearing due to its rotation. Such deformation, which would be impossible if the outer support for the outer bearing race were rigid, results in transferring the bearing load to the structural part sustaining it through a greater number of antifriction bodies than could be employed if the outer support for the outer bearing race were rigid and deformation thereof were impossible. This combination of an elastic collar in direct contact with the outer race of the antifriction bearing and exerting a substantial radial pressure thereon, thus serves not only to dampen thrusts but also to permit a considerable increase in the load capacity of the bearing with which it is used.

A specific embodiment of my invention in the form that I now prefer is illustrated in the accompanying drawing in which.

Figure 1:
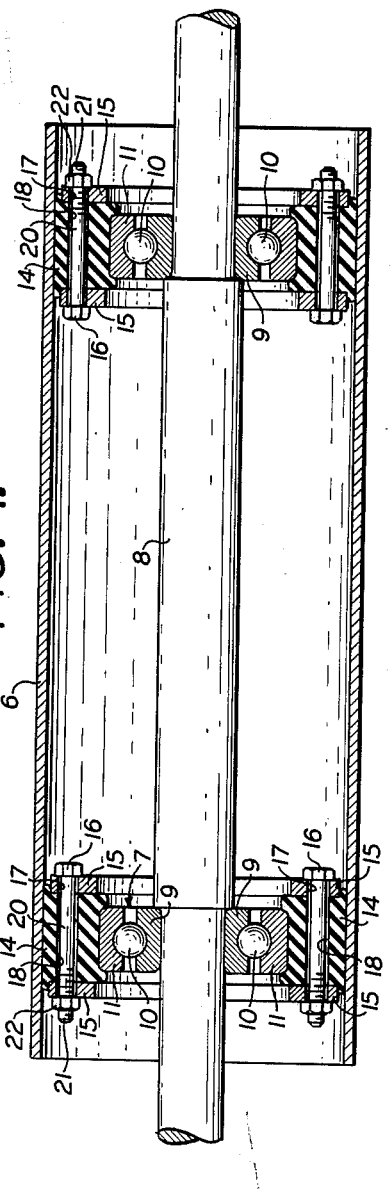
FIG. 1 is a schematic longitudinal section of a support roller elastically mounted on antifriction bearings for rotation around a central axle.

The apparatus illustrated schematically in FIG. 1 includes a tubular support roller 6 mounted upon antifriction bearings indicated generally at 7 for rotation about central shaft 8. The antifriction bearings 7 include an inner race 9, ball elements 10 and an outer race 11. Each antifriction bearing 7 is connected with support roller 6 adjacent one of its ends through a collar 14 which is composed of a flexible material such as rubber. The dimensions of collar 14 are such that, in its normal uncompressed condition, it has a sliding fit in the bore of tubular support roller 6 and over the outer surface of the outer bearing race 11; and it is wider than bearing race 11. Each flexible collar 14 is located between a pair of compression washers 15. A series of axial tie rods, indicated generally at 16, extend through holes 17 in compression washers 15 and through axial holes 18 in collars 14. The tie rods 16, in the form illustrated in FIG. 1, consist of bolts 20 whose outer ends 21 are threaded to receive nuts 22.

The apparatus illustrated schematically in FIG. 1 may be assembled very easily as follows: The antifriction bearings 7 are placed on the axle 8, and a rubber collar 14, together with its associated compression washers 15 and tie rods 16 but in uncompressed condition, is placed on the antifriction bearings so that the faces of the flexible collar 14 are located in planes outside the corresponding faces of bearing race 11. The support roller 6 is then slid over the antifriction bearing assembly 7 to its desired position. Thereafter the nuts 22 are tightened to draw compression washers toward each other and deform flexible collars 14 so that they expand radially to exert substantial axial pressure on the inner wall of support roller 6 and the outer face of bearing race 11. It will be appreciated that the magnitude of the axial pressure exerted by the flexible collars 14 will depend upon the extent of the deformation thereof caused by tightening nuts 22 to draw compression washers 15 toward each other. The apparatus may be very readily disassembled by reversing the foregoing procedure and it is noteworthy that it is not necessary in either case to strike the parts to put them into, or out of, assembled position.

Figure 2:
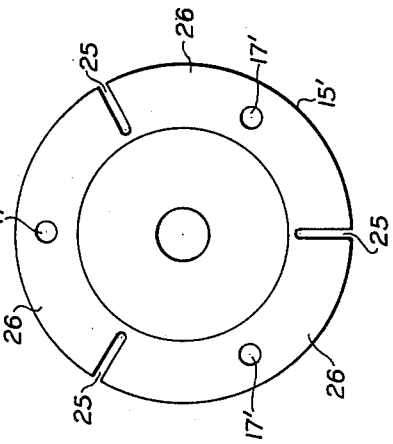
FIG. 2 is a front elevation of a modified form of compression washer.

The modified form of compression washer 15' illustrated in FIG. 2 is designed to permit variations in the extent to which different sections of flexible collar 14 are expanded radially when the tie rod nuts are tightened. It is provided with a series of slots 25 which divide washer 15' into segments 26. Each segment 26 is provided with a hole 17' for the reception of a tie rod 16. This permits regulation of the extent to which that portion of a flexible collar 14 which corresponds with a segment 26 may be deformed when the nut associated with the tie rod for that particular segment is tightened, thus permitting compensation for deviations from a circle in the inner wall of tube 6, such as may be caused by differences in tube wall thickness for instance.

Figure 4:
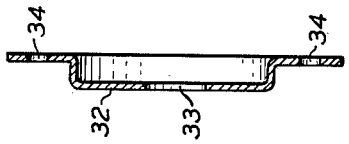
FIG. 4 is a transverse section of a cover disc for my bearing structure.
Figure 3:
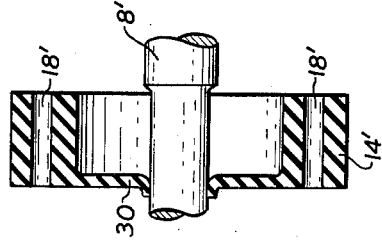
FIG. 3 is a transverse section of a modified form of elastic collar.

The modified form of flexible collar 14' illustrated in FIG. 3 is designed to include a protective cover or shield for the antifriction bearings. Like the flexible collar 14 illustrated in FIG. 1, it is made of a material such as rubber and includes axial holes 18' for the reception of tie rods 16; but it differs from collar 14 in that it carries an inturned flange 30 which extends to the end of shaft 8' to provide an outer shield for the associated bearing. In lieu of the shield 30 which is incorporated in the flexible collar 14', a cover plate 32, as illustrated in FIG. 4 may be employed if desired. It includes a central opening 33 for the end of shaft 8 and a series of holes 34 which correspond with holes 17 in washer 15 so that it may be held in place by tie rods 16.

The terms that have been used herein in describing my invention are terms of description and not of limitation and it will be appreciated that the specific embodiment of my invention that I have described may be modified in various particulars, e.g., variations may be made in the profile of the flexible collar 14, without departing from the spirit of my invention as it is defined in the appended claims.

What I claim is:

1. An elastically mounted bearing structure for a tubular roller comprising, in combination with said roller, an antifriction bearing having an outer race housed within said roller, an elastic collar between said outer race and the inner wall of said roller, a pair of segmental compression washers located, respectively, on opposite sides of the collars, and a series of axial tie rods adapted to draw related pairs of washer segments toward each other to deform said collar so that it expands radially and presses against the outer bearing race and said roller wall.

2. The combination, with a cylindrical member and a shaft, of an elastically mounted bearing structure connecting said cylindrical member and shaft for rotary movement with respect to each other and including: an antifriction bearing having an outer race housed within said cylindrical member; an elastic collar of greater width than, and in direct contact with, the outer bearing race and normally adapted to slide between said outer bearing race and the inner wall of said cylindrical member; a pair of compression washers having opposed segments located on opposite sides of the collar and out of contact with said bearing race; and a series of axial tie rods, each adapted to draw a pair of opposed segments of said washers toward each other to deform said collar so that it expands radially and presses against the outer bearing race of said wall of the cylindrical member.

References Cited in the file of this patent

UNITED STATES PATENTS

| 2,070,081 | Henry | Feb. 9, 1937 |
| 2,563,980 | Wahlberg | Aug. 14, 1951 |
| 2,648,577 | Watt | Aug. 11, 1953 |
| 2,865,689 | Anderson | Dec. 23, 1958 |